United States Patent
Dettori et al.

(10) Patent No.: US 7,986,707 B2
(45) Date of Patent: Jul. 26, 2011

(54) METHOD AND SYSTEM FOR RULES BASED WORKFLOW OF MEDIA SERVICES

(75) Inventors: Paolo Dettori, Hartsdale, NY (US);
Julio Nogima, Tarrytown, NY (US);
Frank A. Schaffa, Hartsdale, NY (US);
Diego Sanchez Gallo, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 12/028,962

(22) Filed: Feb. 11, 2008

(65) Prior Publication Data
US 2009/0201812 A1    Aug. 13, 2009

(51) Int. Cl.
*H04L 12/28* (2006.01)

(52) U.S. Cl. ........ 370/423; 370/230; 370/466; 370/422; 370/424; 370/426

(58) Field of Classification Search .................. 370/230, 370/230.1, 231, 252, 352, 389, 395.21, 401, 370/466, 235, 422, 423, 424, 426
See application file for complete search history.

(56) References Cited

U.S. PATENT DOCUMENTS

| | | | |
|---|---|---|---|
| 7,298,725 B2 * | 11/2007 | Rune | 370/338 |
| 2004/0196858 A1 * | 10/2004 | Tsai et al. | 370/401 |
| 2005/0267892 A1 * | 12/2005 | Patrick et al. | 707/10 |
| 2006/0007918 A1 * | 1/2006 | Patrick et al. | 370/352 |
| 2006/0031353 A1 * | 2/2006 | Patrick et al. | 709/206 |
| 2006/0034237 A1 * | 2/2006 | Patrick et al. | 370/338 |
| 2006/0077986 A1 * | 4/2006 | Rune | 370/401 |
| 2006/0171402 A1 * | 8/2006 | Moore et al. | 370/401 |
| 2007/0053513 A1 * | 3/2007 | Hoffberg | 380/201 |
| 2007/0101272 A1 | 5/2007 | Nomura et al. | |
| 2007/0198437 A1 | 8/2007 | Eisner et al. | |
| 2007/0198739 A1 * | 8/2007 | Jennings et al. | 709/231 |
| 2008/0021990 A1 | 1/2008 | Mansilla | |
| 2008/0034367 A1 * | 2/2008 | Patrick et al. | 718/101 |
| 2008/0091949 A1 * | 4/2008 | Hofmann et al. | 713/176 |

OTHER PUBLICATIONS

International Search Report.

* cited by examiner

*Primary Examiner* — Kwang B Yao
*Assistant Examiner* — Nguyen Ngo
(74) *Attorney, Agent, or Firm* — F. Chau & Associates, LLC; Anne V. Doughterty, Esq.

(57) ABSTRACT

A method for executing services over an enterprise service bus includes analyzing a message of a first service to a second service to determine a nature of a digital media object sent from the first service to the second service, analyzing one or more media rules to determine whether one or more intermediary services are to be performed based on the nature of the digital media object, and when it is determined that one or more intermediary services are to be performed, executing, after the first service and before the second service, the one or more intermediary services.

20 Claims, 6 Drawing Sheets

METHOD AND SYSTEM FOR RULES BASED WORKFLOW OF MEDIA SERVICES

BACKGROUND OF THE INVENTION

1. Technical Field

The present disclosure relates to media services and, more specifically, to a method and system for rules based workflow of media services.

2. Discussion of Related Art

An enterprise service bus (ESB) is a software architecture that allows for the performance of complex tasks by a distributed set of middleware services, each service performing a particular component function. The services may cooperate by transferring messages between one another over the bus. The flow of information between services is governed by a workflow. A workflow engine may control and implement the workflow. ESBs may utilize computer networks and web technologies to build the bus and provide for the seamless communication of messages across multiple computing platforms and the execution of the workflow. This distributed approach to the performance of complex tasks allows for enhanced versatility and scalability.

The performance of both the complex task and the component functions may be implemented as web applications, and thus the bus may include the Internet and/or intranets. Each service may be performed by one or more networked servers.

One commercially available implementation of ESB technology may be found within WebSphere, developed and made available by IBM. WebSphere provides a Java-based application environment for building, deploying and managing Internet and intranet web applications.

As digital media objects, such as sound, image and video recordings, are increasingly managed and distributed over ESB architecture, the workflow is tasked with managing not only the exchange of messages but the exchange of the digital media objects. Because digital media objects may be found in a wide variety of forms, the passing of digital media objects between services requires special handling.

For example, a digital image object may have any of a number of image resolutions, color depths, compression methods, compression ratios and file formats. A digital video object may be encoded using any of a number of codecs and compression standards. A digital audio file may have any of a number of bit rates and sampling frequencies and may similarly be encoded using any of a number of encoding and compression standards. The diversity of digital media standards may be represented by the format, which dictates how the media object is encoded, and the transport protocol, which determines how the media can be accessed.

Owing to this wide variety of digital media standards, it is often difficult to pass objects between services when certain services require different standards. Accordingly, when orchestrating a workflow among services, the workflow engine must have intimate knowledge of the particular digital media standards that are passed from one service to another. Digital media contains properties that need to be taken into consideration when building the workflow and care must be taken to ensure that media objects produced by one service may be properly consumed by the next service in the workflow.

When these factors are not properly considered, or when workflow elements are changed without due consideration to how digital media objects may be affected throughout the entire workflow, media mismatch may occur and the workflow may fail.

Accordingly, it may be particularly difficult to change the workflow when new digital media formats are introduced in the production, management and distribution of digital media. As considerable time and cost may be associated with the production of digital assets, the inability to easily pass digital media objects between services in a relatively simple and workflow-independent fashion may be a significant deficiency.

SUMMARY

A method for executing services over an enterprise service bus includes analyzing a message of a first service to a second service to determine a nature of a digital media object sent from the first service to the second service; analyzing one or more media rules to determine whether one or more intermediary services are to be performed based on the nature of the digital media object; and when it is determined that one or more intermediary services are to be performed, executing, after the first service and before the second service, the one or more intermediary services.

The one or more intermediary services may be determined to be performed when the digital media object cannot be consumed by the second service and the one or more intermediary services prepare the digital media object for consumption by the second service. The first service, the second service and the one or more intermediary services may be web services or web applications. The enterprise service bus may route messages over a computer network.

Analyzing the message of the first service to the second service to determine the nature of the digital media object sent from the first service to the second service may include examining one or more properties retrieved from a digital item declaration object portion of a message sent from the first service to the second service. Analyzing the message of the first service to the second service to determine the nature of the digital media object sent from the first service to the second service may include examining an input service message object sent from the first service.

The first service may be a source service of a workflow and the second service may be a destination service of the workflow. The digital media object may be sent from the first service to the second service as a reference to a binary object included in a message sent from the first service to the second service.

The one or more intermediary services may transcode the digital media object to a format that the second service can consume. The one or more intermediary services may reorganize the digital media object in accordance with a transfer protocol that the second service can consume. The one or more intermediary services may prepare the digital media object for consumption by the second service by resampling, reencoding, or translating the digital media object.

A method for executing services over an enterprise service bus includes analyzing a message from a first service to determine a nature of a digital media object sent from the first service to a second service; analyzing one or more characteristics of the second service to determine whether the digital media object can be consumed by the second service; and when it is determined that the digital media object cannot be consumed by the second service, executing, between the first and second services, one or more intermediary services to prepare the digital media object for consumption by the second service.

The determination of whether the digital media object can be consumed by the second service may be performed according to one or more media rules, independent of a workflow that provides for the sending of the digital media object from the first service to the second service.

The first service, the second service and the one or more intermediary services may be web services or web applications.

A method for executing services over an enterprise service bus includes analyzing a message of a first service to an abstract service to determine a nature of a digital media object sent from the first service to the abstract service; analyzing one or more media rules to select a concrete service to be performed in place of the abstract service based on the nature of the digital media object; and performing the selected concrete service in place of the abstract service, after the performance of the first service.

The one or more intermediary services may be determined to be performed when the digital media object cannot be consumed by the second service and the one or more intermediary services prepare the digital media object for consumption by the second service. The first service and the concrete service may be web services or web applications.

A method for executing services over an enterprise service bus includes analyzing a message of a first service to an abstract service to determine a nature of a digital media object sent from the first service to the abstract service; analyzing one or more characteristics of one or more concrete services to determine which of the one or more concrete services can consume the digital media object; selecting a concrete service that can consume the digital media object to be performed in place of the abstract service; and performing the selected concrete service in place of the abstract service, after the performance of the first service.

The selection of the concrete service that can consume the digital media object may be performed according to one or more media rules, independent of a workflow that provides for the sending of the digital media object from the first service to the second service. The first service and the concrete service may be web services or web applications.

A computer system includes a processor; and a program storage device readable by the computer system, embodying a program of instructions executable by the processor to perform method steps for executing services over an enterprise service bus. The method includes analyzing a message of a first service to determine a nature of a digital media object sent from the first service; analyzing one or more media rules to determine whether a second service is to be performed based on the nature of the digital media object; and when it is determined that the second service is to be performed, executing, after the first service, the second service. p The second service may be a service that can consume the digital media object. The second service may prepare the digital media object for consumption by a third service. The second service may be a concrete service that replaces an abstract service in a workflow. The first service and the second service may be web services or web applications.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide an approach for orchestrating workflow execution in a manner that is independent of digital media object variances such as format and protocol. Accordingly, workflow may be constructed without regard to the digital media object particulars and yet media properties mismatch may still be avoided.

This may be performed by providing a set of media rules that may manage the special handling of digital media objects by influencing workflow to ensure compatibility of media objects between services. When using these media rules, the workflow may be designed without regard to the particulars of the digital media objects and changes in workflow could be performed without having to consider the possibility of media properties mismatch.

Exemplary embodiments of the present invention provide for the extension of the dynamic routing capabilities in the Enterprise Service Bus (ESB) to include rules that are media sensitive. For example, a media rule may state that if a service produces a digital media in a format that the next service in a workflow cannot consume, a transformation service may be inserted at runtime between the two services to convert the media to a consumable format.

A media rules engine may be defined that brings "media-awareness" to the Enterprise Service Bus. By abstracting the notion of media format, transfer protocol, and other properties, a business analyst tasked with designing the workflow can focus on the "business" side of the process instead of having to worry about the technical aspects of the media. As a result of the execution of the media services that were not defined in the original workflow may be added during runtime. Furthermore the services themselves can be abstracted at the workflow level by letting the execution engine select the appropriate service to handle the required media at runtime. This way when building the workflow the business analyst does not need to specify a particular service but only the type of the service (abstract service). For example, rather than specifying between a "repository1" service, a "repository2" service, etc., only a general reference to a repository need be included. The precise selection of the appropriate repository may be performed on-the-fly by the media rules engine.

Exemplary embodiments of the present invention may utilize the mediation capabilities of the Enterprise Service Bus. These mediation capabilities may provide access to the content of the messages being exchanged between the services and may define which service to call next during a workflow execution. Accordingly, the workflow may be dynamically changed during execution. New services (that were not defined in the original workflow) can be added and/or services defined in the workflow may be skipped. The determination as to what services may be added and skipped may be based on the media properties and the capabilities of the services involved. The rules for making this determination may be included among the set of media rules. The rules engine may be tasked with executing the media rules and making the appropriate determinations.

Figure 1:
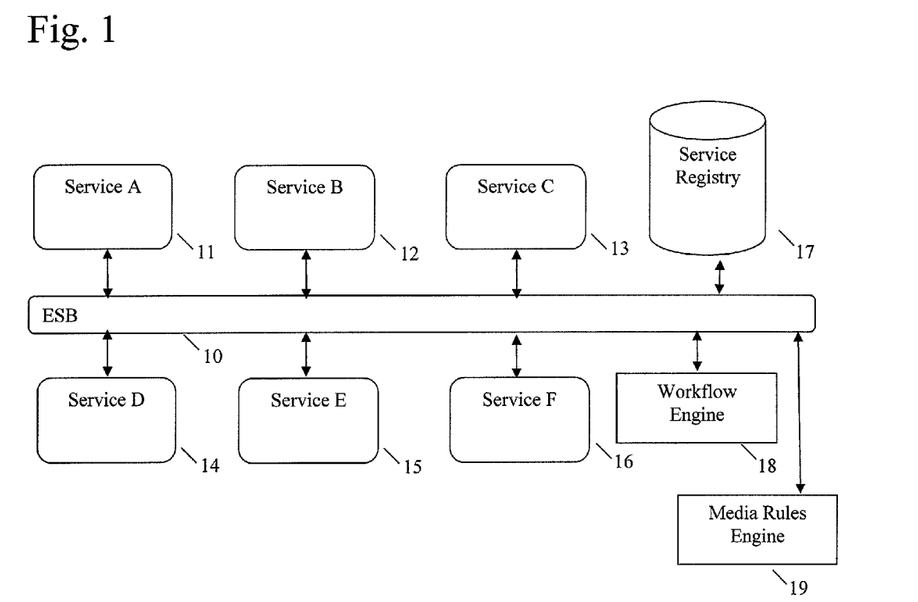
FIG. 1 is a diagram illustrating an Enterprise Service Bus (ESB) with multiple services.

FIG. 1 is a diagram illustrating an Enterprise Service Bus (ESB) with multiple services. The ESB may be implemented as a software component connected to a computer network. The bus 10 may be in connection with any number of registered media services via the computer network. A service registry 17, in communication with the bus 10, maintains a list of those services that are registered on the bus 10 along with their properties. Here, Service-A 11, Service-B 12, Service-C 13, Service-D 14, Service-E 15, and Service-F 16, are all in communication with the bus 10. In one exemplary implementation, each service may be executed by a server running on a computer system. The computer systems may be interconnected through a computer network such as an intranet or the Internet. This computer network may implement a software component that forms the bus 10. The workflow may then be created by defining the sequence in which information including the media is to be passed among one or more of the registered services. The workflow engine 18 is then used to execute the workflow. During the workflow execution, messages may be passed between the services through the ESB 10. The messages may include one or more media files, either as a binary attachment, as a pointer to the media file, or by some other means. A media object addressed to a service may then be analyzed and the capabilities of the service discovered. This information is then fed to the media rules engine 19 together with contextual information, for example: time, location, user credentials, previous service, etc. and it is determined whether the execution should follow as specified in the workflow or should be changed. This verification may be performed every time a service is called. Accordingly, implementation of exemplary embodiments of the present invention may take the form of a mediation component running on the ESB 10.

Not every service necessarily involves the use of digital media objects. Traditional services may simply receive as input, messages from one or more services and may provide as output, messages to one or more services. Other services are media related services and thus deal with creating, managing and distributing of digital media objects either in addition to or instead of other messages. All of these services may be considered "concrete services" since they represent an actual service executed by a server in communication with the bus. Other services that may be referenced by the workflow may be "abstract services" and may thus merely represent an option of calling one or more concrete services, the decision for calling a particular concrete service being made by the rules engine using the media rules at run time.

Given the ESB arrangement shown in FIG. 1, a workflow may be created to call upon various services in a particular order. For example, first Service-A may be called upon, next Service-E may be called upon, and finally Service-C may be called upon. A workflow could also contain a service that does not map directly to any of the services registered into the bus but rather specifies a service of a particular type. Such a service may be considered an "abstract service". For example, first Service-A may be called upon, next the abstract service may be called upon, and finally, Service-C may be called upon. During the execution of the workflow the abstract service may be replaced by one of the concrete services registered on the bus (e.g. Service-E). The replacement may be performed by the mediation component in the ESB. The mediation component may invoke the media rules engine which may evaluate the selection rules and select the appropriate service with which to replace the abstract service.

In performing this replacement, a message from Service-A to Service-E may be intercepted by a "mediation component" in the Enterprise Service Bus. The mediation component interacts with the media rules engine to evaluate the insertion rules. During the execution of the workflow, a set of media rules registered with the ESB may cause one or more services to be inserted between A and E. The mediation component may either call the next service directly (in this example, Service-E) or produce a list of intermediary services that may be fed back to the workflow execution engine for processing.

Figure 2:
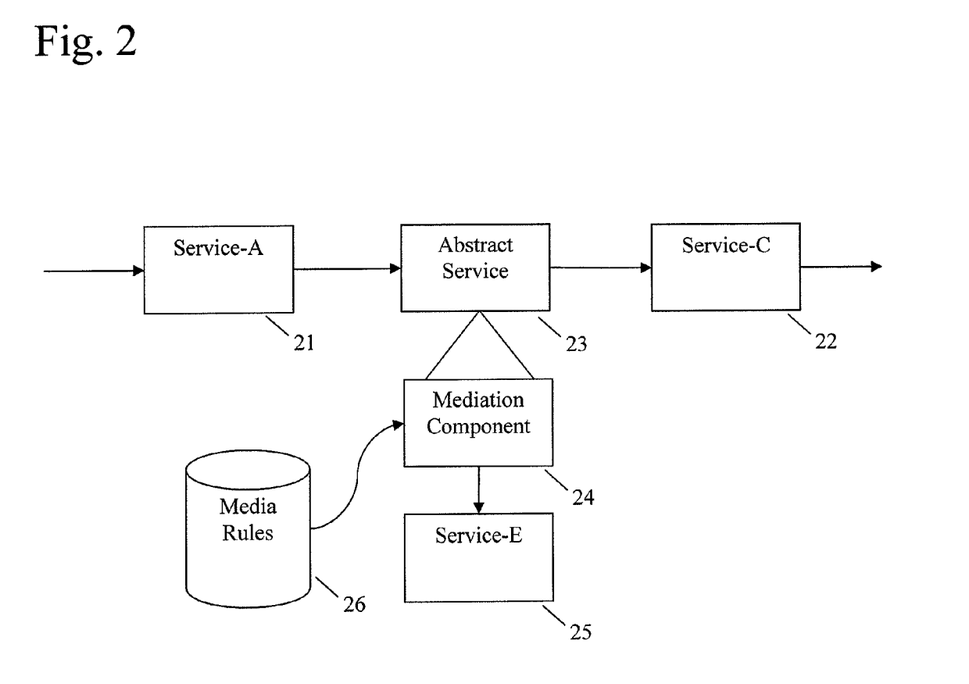
FIG. 2 is a diagram illustrating a workflow according to an exemplary embodiment of the present invention.

FIG. 2 is a diagram illustrating a workflow according to an exemplary embodiment of the present invention. In the illustrated workflow, first Service-A 21 is called. Next, an Abstract Service 23 is called. A Mediation Component 24, in applying one or more media rules 26, calls upon an appropriate concrete service to serve as the Abstract Service 23, here Service-E 25. Finally, Service-C 22 is called.

The media rules may be stored in a media rules database. Each media rule may include code to evaluate conditions relevant to a digital media object that is passed between services. Under the appropriate set of conditions, the code of the media rule may define an appropriate action.

A media rule may consider one or more aspects including:

(1) Media: The properties of the digital media object to be sent to a destination service may be considered. These properties may be retrieved from a Digital Item Declaration (DID) object. The DID object is a portion of the message traveling from source service to destination service that represents the properties of the digital media object being transferred, for example, the DID may include object metadata such as format and transfer protocol. The message traveling from the source service to the destination service that includes the DID object and the digital media object may be an input service message object. The service message object is responsible for providing an abstract data representation from processing and manipulating messages exchanged between services.

(2) Destination: The properties of the destination service may be considered. These properties may be retrieved from the service registry of the ESB. Media-specific capabilities, for example, media requirements for the input and resulting media properties for the output, may be stored in the services registry for each one of the media services. Service endpoint information found in the input service message object may be used to examine the service registry and retrieve the service information. Where the endpoint information is not present, the destination may be assumed to be an Abstract Service. The mediation component may include a "Classification" property that may indicate the type of the destination service.

(3) Context: The context in which the destination service is being called may be considered. Context information may include, for example, a message ID, security principal information, geographical information, time and other properties that may be defined through name/value pairs.

In evaluating the media rules, after having considered information, for example, the media, destination, and/or context information listed above, the rules engine may take action to modify the prescribed workflow. Examples of actions that may be taken include:

(1) Insert: One or more new services may be inserted into the workflow and may thus be called after the source service and prior to calling the destination service.

(2) Select: Where the workflow calls for an abstract service, a concrete service may be selected for its place.

(3) No action: After considering the situation, for example, as discussed above, the rules engine may determine that the workflow may be allowed to continue without modification.

The media rules may be conceptualized as belonging to one of two categories: selection rules and insertion rules. Selection rules are rules for determining which one of the concrete services to select to be called in place of an abstract service. Selection rules may be evaluated prior to insertion rules. Thus a selection rule may be used by a mediation component to resolve a list of one or more concrete destination services to be called as part of the workflow.

For example, the destination service may be an abstract service indicating that a repository is to be called and the media may be formatted in accordance with MPEG4 standards. Here, a selection rule may state that if the destination service is of type "repository" and the media received is formatted as an MPEG4 object, appropriate action will be to call upon a Repository-1 service as the destination service. Once the selection rule is executed, the rule may specify that the Repository-1 service is to be called as the destination service. Afterwards, when the insertion rules are evaluated, the Repository-1 service, rather than the abstract repository service, may be taken as the destination service for the purposes of considering the insertion rules. In this example, insertion rules may be constructed to handle concrete services rather than abstract services. Where no selection rule applies, a lookup into the services registry will retrieve all the concretes services to be called for that particular abstract service before executing the insertion rules. Then the insertion rules may be executed with respect to each one of these concrete services that comprise the workflow.

The media rules may be coded in any language, however, platform-independent scripting languages such as JavaScript, JACL, Jython, etc., may be easier to code, in this context, than using a procedural language. The use of a scripting language may also make it easier to separate the code that is responsible for evaluating the rules (implemented in a programming language such as Java) from the rule itself. Accordingly, new rules may be added and existing rules may be modified or deleted without having to redeploy the code that is responsible for evaluating the rules. Accordingly, the rules engine code may be isolated from the rules code. For example, the media rules may be coded using the Jython scripting language.

The media rules scripts may call for the execution of various Java classes (including JavaBeans), Java Applets, and other objects, which may be accessible both to the scripts and the Java code. When the media rule is processed, required objects may be looked up, imported, and thus made available to the script. It may be up to each script to determine which objects to use.

Examples of objects that may be used in the media rule scripts include:

(1) Destination: A destination object may be used to represent a destination service according to its properties. The destination service may be a concrete destination service or an abstract destination service. As discussed above, the selection rules may use abstract services as the destination service while insertion rules may require the destination service to be a concrete service.

(2) Media: A media object may be used to represent the media received by the destination service.

(3) Context: A context object may be used to represent the context in which the destination service is called.

(4) Action: An action object may represent the resulting action taken by a media rule evaluation. This object may be set if an insertion or selection rule applies. The rules engine may use an action object to obtain information about the result of the rules execution.

(5) Transcoder: A transcoder object may represent an abstract transcoder service. Such an object may be used if a transcoder service is to be inserted into the workflow.

(6) Datamover: A datamover object may represent an abstract data mover service. Such an object may be used if a data mover service is to be inserted into the workflow.

(7) Repository: A repository object may represent an abstract repository service. Such an object may be used if a repository service is to be inserted into the workflow.

(8) Watermarker: A watermarker object may represent an abstract watermarking service. Such an object may be used if a watermarker is to be inserted into the workflow.

(9) Notifier: A notifier object may represent an abstract notifier service. Such an object may be used if a notification service is to be inserted into the workflow.

(10) Publisher: A publisher object may represent an abstract publisher service. Such an object may be used if a publisher service is to be inserted into the workflow.

In addition to the calling objects, the media rules scripts may include a condition statement. Media objects, destination objects and context objects may each be used to specify the conditions that are analyzed by the rules engine to determine what, if any, action is to be taken.

Listed below are several examples of conditions that may be used. Any combination of these and other conditions may be used. The example conditions include:

(1) A check to determine if a destination service is able to consume media in a given format. Here, the format name, family, and/or audio/video codec information may be used to make this determination. This check may be used to determine if a transcoder service should be inserted to transcode the media into a format and/or transfer protocol that may be consumed by the destination service.

(2) A check to determine if a destination service is able to access content specified by a media URL. This may include, for example, a check to determine whether the media transport protocol and location of the media are accessible to the destination service. Where the media is not so accessible, it may be determined that a data mover service should be used to move the media from the source service to the destination service.

(3) A check to determine if a destination service belongs to a particular predefined classification.

(4) A check to determine if media has a particular format name, format family, and/or encoded using a particular audio or video codec.

(5) A check to determine if a destination service has particular user information or other security credential information that may be propagated between services to limit media access to authorized users.

(6) A check to determine if a particular property has a value within a predetermined range when a destination service is called. Such a check may be used to ensure the destination service has all required inputs prior to being called.

The rules scripts may also include a resulting action statement to implement a particular action in response to one or more conditions. There may be two types of actions, actions that insert a service into the workflow and actions that select a concrete service in the place of an abstract service, as discussed in detail above. Multiple selection rules may exist and multiple concrete services may be selected for a given abstract service.

A priority mechanism may be implemented to resolve a potential conflict where more than one rule may apply. Each service may be assigned a priority number representing its level of priority. For example, every service may be ordered from highest priority to lowest priority. Accordingly, priority may be resolved by the rules interpreter.

Figure 3:
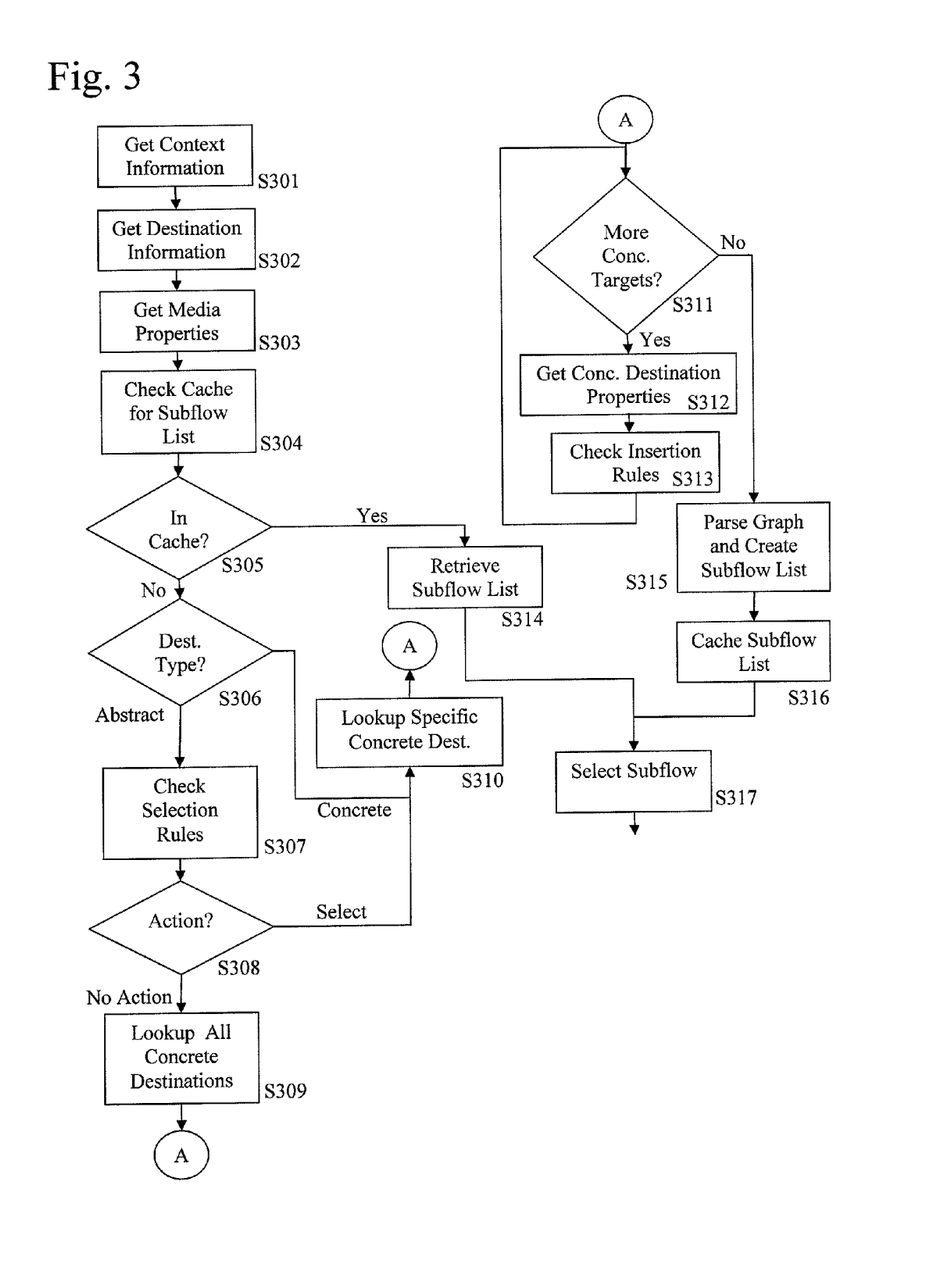
FIG. 3 is a flow chart illustrating an operation of a mediation component according to an exemplary embodiment of the present invention.

As discussed above, a mediation component may be used to determine how to evaluate the set of one or more media rules during workflow execution. FIG. 3 is a flow chart illustrating an operation of a mediation component according to an exemplary embodiment of the present invention. The process may start by obtaining information related to the context in which the digital media object is being sent (Step S301). This information may be gathered from the message that is sent from a source service to a destination service. Additional contextual information such as time and location can be obtained directly by the mediation component. Then, information pertaining to the destination service may be obtained (Step S302). The context information may be provided either by properties defined in the input message or properties defined for the mediation component. The destination service classification (for example, the type of service) may be obtained from a property that is configurable in the mediation component. The destination service endpoint information may be part of the input message. Where the endpoint information is not present, it may be assumed that the destination service is an abstract service. Next, media properties pertaining to the digital media object may be obtained (Step S303). The media properties may be retrieved from the DID present in the input message.

A cache may be used to keep the results of previous rules execution so that if a combination of context, destination service and media are presented again there is no need to re-evaluate the rules. This result of rules execution may include a listing of one or more concrete services to execute, the proper order in which these services should be executed and any other information pertinent to executing the flow of the inserted. Collectively this information may be referred to as a subflow and the subflow may include the logic responsible for correctly performing the list of services.

The cache may be invalidated when there is a change in either the media rules or the service registry thus preventing the situation where an application of old rules stored in the cache are replied after the rules have been changed. Thus, the mediation component may check the cache to determine if the proper subflow list for the present set of conditions is stored within the cache (Step S304). If the subflow is not found in the cache (No, Step S305), then the type of the destination service may be ascertained (Step S306).

If the destination is an abstract service (Abstract, Step S306), then the selection rules are checked (Step S307). Checking of the abstract service may result in an action, for example, a concrete service may be selected (Select, Step S308). A concrete service so selected may become then the service to be used as the destination in the remaining of the process.

If, at step S306, the destination service was determined to be a concrete service (Concrete, Step S306), or after a concrete service has been selected for the abstract service (Select, Step S308), a lookup into the services registry may be performed to retrieve the properties of the particular concrete service (Step S310). In case no selection is returned as the result of the selection rules evaluation (No Action, Step S308) a lookup into registry is performed to get all of the concrete services and their properties for services belonging to the service type of the abstract destination (Step S309). These concrete services are then used as the destination services for the remainder of the operation.

After the concrete destination service(s) have been looked up (Steps S309 or S310), it may be determined whether more concrete destination services are yet to be evaluated for the insertion rule (Step S311). Evaluation of each concrete service is performed for the purposes of determining which of the concrete services should be selected in accordance with the selection rule evaluation process, and thus rule-by-rule evaluation continues until there are no more concrete services to be evaluated. If it is determined that additional concrete services are to be analyzed (Yes, Step S311), then the properties for the other concrete destination service(s) may be retrieved (Step S312) and the insertion rules are checked (Step S313).

The insertion rules are checked (Step S313) to determine whether one or more intermediary services are to be inserted before the concrete destination service. This evaluation may be performed for each one of the concrete destinations, for example, until all services from the list of concrete services have been evaluated. This evaluation may be used to verify whether there is a need to add a service (or services) before the destination service. These needs may be expressed through the insertion rule scripts. As a result of this analysis, a number of services can be chained together in a sequence with the original destination service at the end of the chain. This chain may be referred to as a subflow of services. As there may be more than one destination service candidate, multiple subflows may be created. In addition since an inserted service is an abstract service and the subflow representation only contains concrete services, all the possible concrete services for a particular abstract service may be considered and the number of possible solutions increases.

Although any number of subflows may result from the rules evaluation, according to an exemplary embodiment of the present invention, only one of the sublows need be executed by the workflow engine at runtime. Metrics may be used to evaluate the total cost of each subflow based on parameters such as CPU load, disk space availability, network bandwidth availability, service queue size, etc., for each of the services. The subflow with the lowest cost may then be selected for execution.

A graph representation may then be used internally to represent all the possible solutions (or subflows). After it is determined that there are no more concrete destination services (No, Step S311), the graph object may then be parsed and a list of subflows may be created (Step S315). Once created, the list may be cached (Step S316).

If in Step S305 it was determined that the subflow list was in the cache (Yes, Step S305) then the subflow may be retrieved (Step S314). Then the subflow list may be selected (Step S317). If the subflow list was not in the cache (No, Step S305) then after the subflow list has been added to the cache (Step S316), the subflow list may be selected (Step S317).

Figure 4:
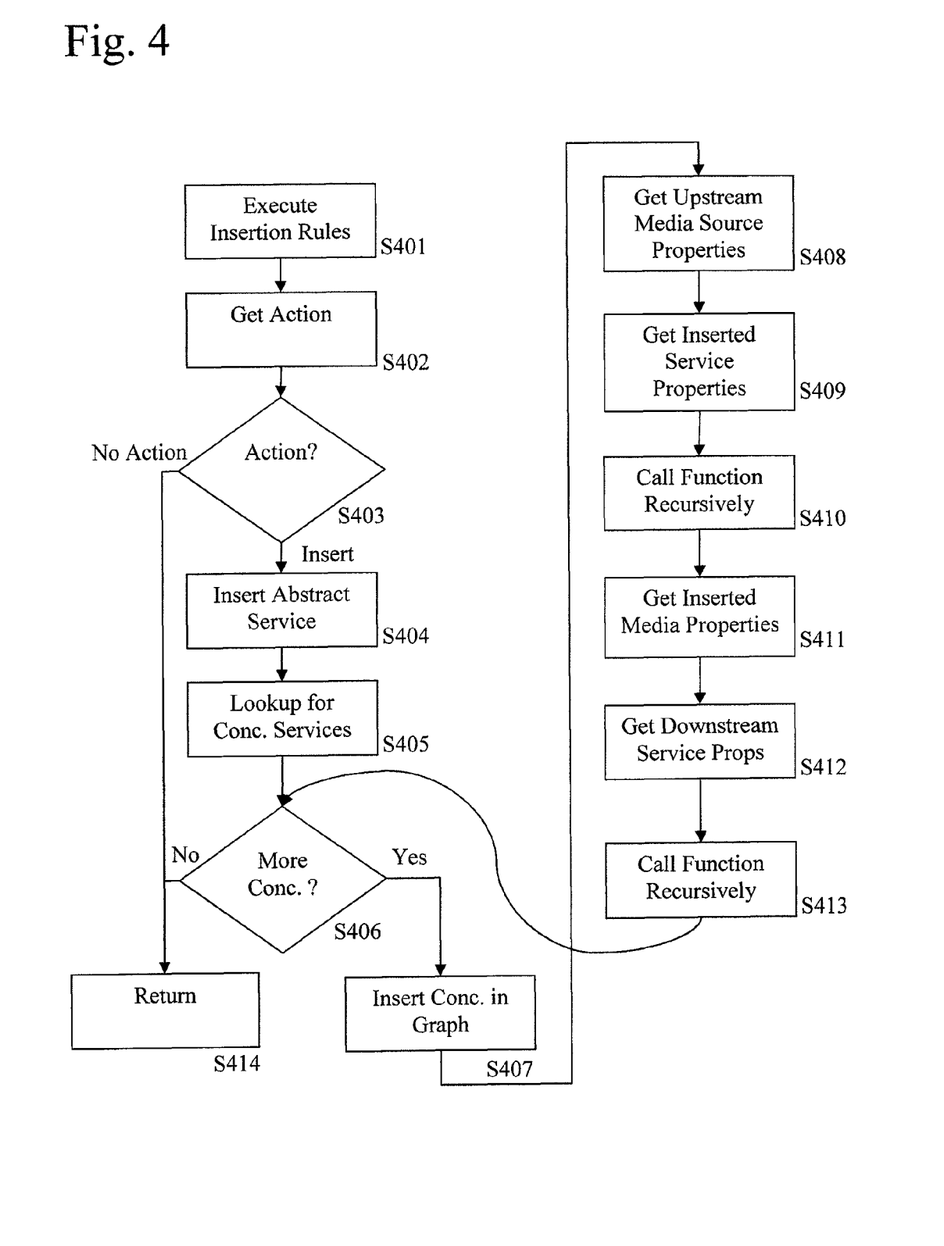
FIG. 4 is a flow chart illustrating a method for checking the insertion rules according to an exemplary embodiment of the present invention.

The checking of the insertion rule (Step S313) is now described in greater detail. FIG. 4 is a flow chart illustrating a method for checking the insertion rule (Checking Insertion Rules process) according to an exemplary embodiment of the present invention. This function may be used to create the graph of the inserted service(s). This function may be called recursively each time a new service is inserted. It may take as input, the media properties, the concrete destination service properties and the context in which the destination service is being called.

First, insertion rules may be executed using as input: a context, a media and a concrete service as described above (Step S401). The execution of the insertion rules may include evaluating each of the insertion rules and checking its resulting action (Step S402). The result of this execution may either be an insertion (Insert, Step S403) or no action (No Action, Step S403). Where no action is to be taken (No Action, Step S403), the process ends and returns to the process described previously (Step S414). If more than one rule applies, the conflict is resolved according to a pre-defined priority arrangement. The priority arrangement may define which service has higher priority and may ultimately determine which service is to be inserted.

If the result is an insertion (Insert, Step S403) an abstract service is inserted before the destination service (Step S404). A lookup into the registry may retrieve the concrete services candidates for the inserted abstract service (Step S405). The services properties used for the lookup may depend on the type of service inserted. If, for example, the service is a transcoder, the lookup may use the media format properties and the destination service format requirements to find the concrete transcoder candidates that can handle the required format conversion. The insertion rule script may provide additional properties information that may also be used for the lookup of the concrete service candidates.

Next, all of the concrete services may iteratively be considered for addition until there are no further concrete services to consider (No, Step 406) and the process is returned (Step S414).

A graph may be created to keep track of the services being inserted. The graph may start with two nodes: the first node may represent the source service, and the second may represent the destination service. These two nodes may be connected through a link. Every time a concrete service is inserted this link may be removed and a new node is added between the two first nodes. Two new links may then be created; one to connect the source service to the inserted node, and another to connect the insert node to the destination. The insertion rules may then be evaluated again to see if there is a need to insert a new service in these links.

Where there are more concrete services to consider (Yes, Step S406), an evaluation process may be repeated until there are no more concrete services to consider (No, Step S406). Each of the concrete services candidates may be evaluated for additional insertion requirements. The evaluation process may include inserting the added concrete service to the graph (Step S407) and checking for additional insertion of services in the link connecting the upstream node to the inserted node and in the link connecting the inserted node to the downstream node. The first link may be verified by getting the media source properties of the upstream service (Step S408), getting the inserted service properties (Step S409) and calling the 'Check Insertion Rules' process recursively (Step S410). The second link is checked by getting the media properties produced by the inserted service (step S411), getting the downstream service properties (Step S412) and calling the 'Check Insertion Rules' process recursively (step S413).

Accordingly, the evaluation process recursive as it executes the insertion rules. The inserted node may act as both the source and destination node depending on which link is being checked. For the first link it acts as a destination node with the source node being the initial source service. For the second link it acts as a source node with the destination node being the initial destination service. This process may continue until no more insertion rules apply. As described above, this process may be repeated for each one the concrete inserted services candidates. At the end of the process a graph representing all the inserted services with their connections may have been created.

Figure 5:
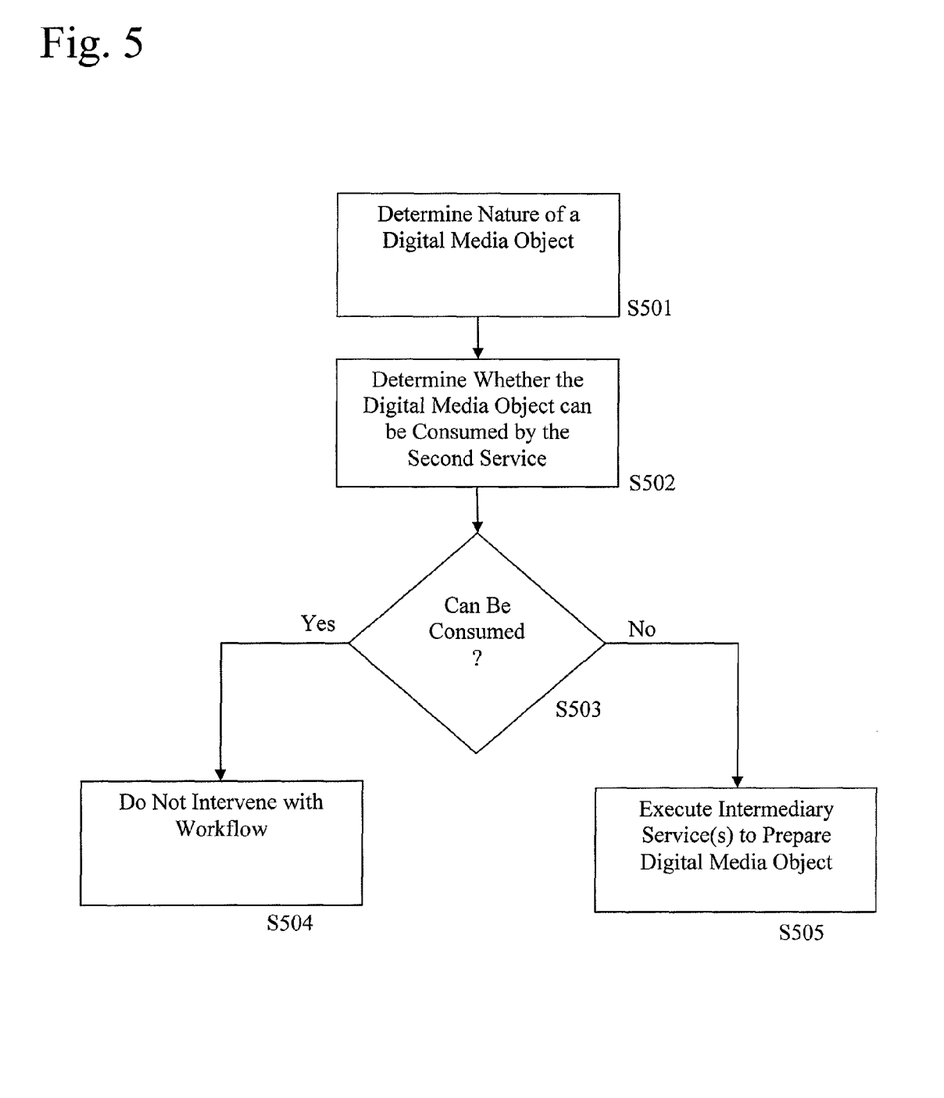
FIG. 5 is a flowchart illustrating a method for executing services over an enterprise service bus according to an exemplary embodiment of the present invention.

FIG. 5 is a flowchart illustrating a method for executing services over an enterprise service bus according to an exemplary embodiment of the present invention. This method is presented as an overview of a particular exemplary embodiment of the present invention, and it is to be understood that the details and one or more optional variations of this approach may be gleamed from the disclosure presented above. First, a determination is made as to the nature of a digital media object that is to be communicated as part of a message, from a first service (a source service) to a destination service (destination service) (Step S501). Then, a determination is made as to whether the digital media object can be consumed by the second service (Step S502). If the digital media object can be consumed by the second service (Yes, Step S503) then the normal workflow is allowed to proceed uninterrupted with the digital media object being sent to the second service (Step S504). If the digital media object cannot be consumed by the second service (No, Step S504) then an intermediary service or services may be executed to prepare the digital media object for consumption by the second service (Step S505).

Figure 6:
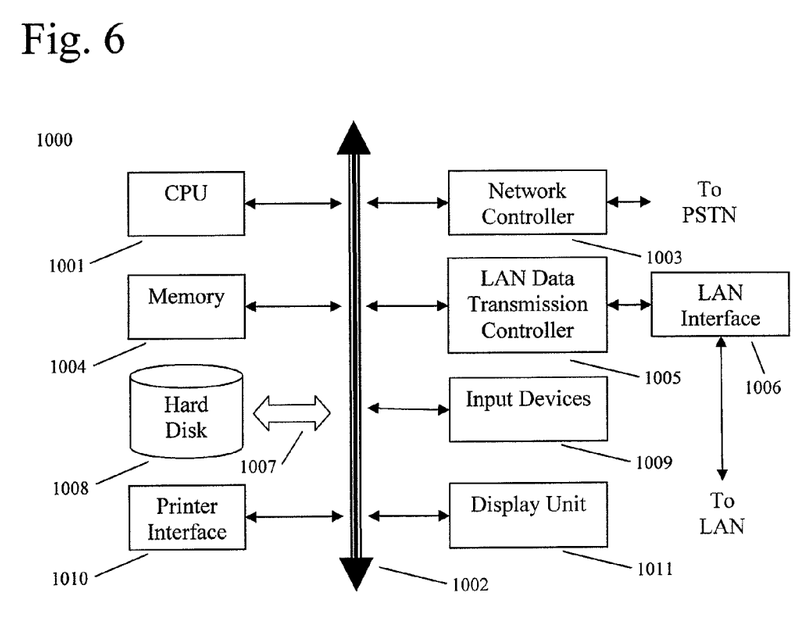
FIG. 6 shows an example of a computer system capable of implementing the method and apparatus according to embodiments of the present disclosure.

FIG. 6 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for executing services over an enterprise service bus, comprising:

analyzing a message of a first service to a second service to determine a nature of a digital media object sent from the first service to the second service;

analyzing one or more media rules to determine whether one or more intermediary services are to be performed based on one or more digital media standards representing format or transport protocol of the digital media object; and executing, after the first service and before the second service, the one or more intermediary services, which are inserted into a service execution workflow, when it is determined that one or more intermediary services are to be performed, wherein the one or more intermediary services are determined to be performed when the digital media object cannot be consumed by the second service, because of an inability of the second service to interpret the format or transport protocol of the digital media object, and wherein the service execution workflow represents an order in which services are executed and data is passes between services.

2. The method of claim 1, wherein the one or more intermediary services prepare the digital media object for consumption by the second service.

3. The method of claim 1, wherein the enterprise service bus routes messages over a computer network.

4. The method of claim 1, wherein analyzing the message of the first service to the second service to determine one or more digital media standards representing format or transport protocol of the digital media object sent from the first service to the second service includes examining one or more properties retrieved from a digital item declaration object portion of a message sent from the first service to the second service.

5. The method of claim 1, wherein analyzing the message of the first service to the second service to determine one or more digital media standards representing format or transport protocol of the digital media object sent from the first service to the second service includes examining an input service message object sent from the first service.

6. The method of claim 1, wherein the first service is a source service of the service execution workflow and the second service is a destination service of the service execution workflow.

7. The method of claim 1, wherein the digital media object is sent from the first service to the second service as a reference to a binary object included in a message sent from the first service to the second service.

8. The method of claim 1, wherein the one or more intermediary services include a transcoder service, a watermarking service, a notifier service, or a publisher service.

9. The method of claim 1, wherein the one or more intermediary services reorganize the digital media object in accordance with a transfer protocol that the second service can consume.

10. The method of claim 1, wherein the one or more intermediary services prepare the digital media object for consumption by the second service by resampling, reencoding, or translating the digital media object.

11. A method for executing services over an enterprise service bus, comprising:
analyzing a message from a first service to determine one or more digital media standards representing format or transport protocol of a digital media object sent from the first service to a second service;
analyzing one or more characteristics of the second service to determine whether the digital media object can be consumed by the second service by determining whether the second service has programming necessary to interpret the format or transport protocol of the digital media object; and
executing, as part of a service execution workflow, one or more intermediary services between the first and second services to prepare the digital media object for consumption by the second service, when it is determined that the digital media object cannot be consumed by the second service,
wherein the service execution workflow represents an order in which services are executed and data is passed between services.

12. The method of claim 11, wherein the determination of whether the digital media object can be consumed by the second service is performed according to one or more media rules, independent of the service execution workflow that provides for the sending of the digital media object from the first service to the second service.

13. A method for executing services over an enterprise service bus, comprising:
analyzing a message of a first service to an abstract service to determine one or more digital media standards representing format or transport protocol of a digital media object sent from the first service to the abstract service;
analyzing one or more media rules to select a concrete service to be performed in place of the abstract service based on the nature of the digital media object; and
performing the selected concrete service in place of the abstract service within a service execution workflow representing an order in which services are executed and data is passed between services, after the performance of the first service,
wherein the one or more media rules operate to select a concrete service to be performed in place of the abstract service when it is determined that the abstract service cannot consume the digital media object because of an inability of the abstract service to interpret the format or transport protocol of the digital media object.

14. The method of claim 13, wherein the one or more intermediary services prepare the digital media object for consumption by the second service.

15. A method for executing services over an enterprise service bus, comprising:
analyzing a message of a first service to an abstract service to determine one or more digital media standards representing format or transport protocol of a digital media object sent from the first service to the abstract service;
analyzing one or more characteristics of one or more concrete services to determine which of the one or more concrete services can consume the digital media object by determining which of the concrete services has programming necessary to interpret the format or transport protocol of the digital media object;
selecting a concrete service that can consume the digital media object to be performed in place of the abstract service; and
performing the selected concrete service in place of the abstract service within a service execution workflow representing an order in which services are executed and data is passed between services, after the performance of the first service.

16. The method of claim 15, wherein the selection of the concrete service that can consume the digital media object is performed according to one or more media rules, independent of a workflow that provides for the sending of the digital media object from the first service to the second service.

17. A computer system comprising:
a processor; and
a program storage device readable by the computer system, embodying a program of instructions executable by the processor to perform method steps for executing services over an enterprise service bus, the method comprising:
analyzing a message of a first service to determine one or more digital media standards representing format or transport protocol of a digital media object sent from the first service;
analyzing one or more media rules to determine whether second services can consume the digital media object by determining whether the second services have programming necessary to interpret the format or transport protocol of the digital media object; and executing, as part of a service execution workflow, after the first service, the second services, when it is determined that the second services can consume the digital media object, wherein the service execution workflow represents an order in which services are executed and data is passed between services.

18. The computer system of claim 17, wherein the second service prepares the digital media object for consumption by a third service.

19. The computer system of claim 17, wherein the second service is a concrete service that replaces an abstract service in the service execution workflow.

20. The computer system of claim 17, wherein the first service and the second service are web services or web applications.

* * * * *